No. 833,523. PATENTED OCT. 16, 1906.
G. O. HILDEBRAND.
NON-REFILLABLE BOTTLE.
APPLICATION FILED MAY 16, 1906.

Witnesses
Edwin L. Bradford
G. Ferdinand Vogt.

Inventor
Gould O. Hildebrand

By Mann & Co,
Attorneys

UNITED STATES PATENT OFFICE.

GOULD O. HILDEBRAND, OF BALTIMORE, MARYLAND, ASSIGNOR OF ONE-FOURTH TO LOUIS G. EBERHARDT, ONE-FOURTH TO WILLIAM ATSCHILD, AND ONE-FOURTH TO TIMOTHY O. HEATWOLE, OF BALTIMORE, MARYLAND.

NON-REFILLABLE BOTTLE.

No. 833,523.           Specification of Letters Patent.           Patented Oct. 16, 1906.

Application filed May 16, 1906. Serial No. 317,048.

*To all whom it may concern:*

Be it known that I, GOULD O. HILDEBRAND, a citizen of the United States, residing at Baltimore, in the State of Maryland, have invented certain new and useful Improvements in Non-Refillable Bottles, of which the following is a specification.

This invention relates to an improved non-refillable bottle.

The object of the invention is to provide an improved glass passage-way for insertion within the neck of an ordinary bottle, where it is to be permanently secured, and which will permit the liquid contents to be poured out, but will prevent liquid from being put into the bottle.

The invention is shown in the accompanying drawings, in which—

Figure 1:
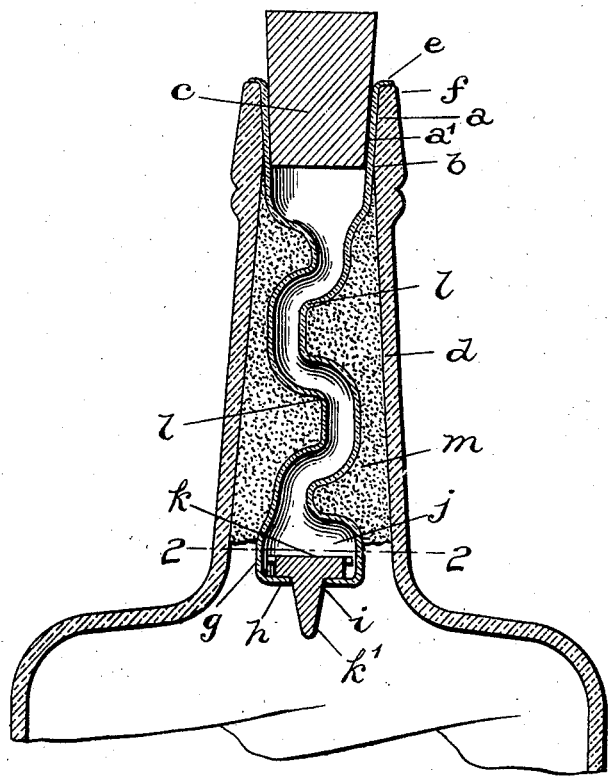
Figure 2:
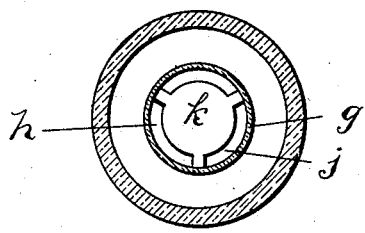

Figure 1 is a vertical section of the neck of a bottle having the improved device in position. Fig. 2 is a cross-section of the neck of the bottle on the line 2 2.

It is common to find bottles in ordinary use that have the interior portion of the neck near the mouth end slightly flaring or expanded, as at $a$, the smallest part of the neck internally being at the point $b$, where the innermost end of the stopper $c$ will come when the stopper has been forced in. The interior of the neck, extending from the said smallest part down to the body of the bottle, gradually expands, as at $d$. Thus at one point the interior of the neck has its smallest diameter, and therefrom upward and downward the neck is slightly expanded.

I take a glass tube and by subjecting it to heat produce the following form: At the upper end is an outward flange $e$, which fits snugly upon the lip edge $f$ of the bottle-mouth. Below said outward flange the tube has a gradually-contracted part $a'$, which snugly fills the expanded part $a$ of the bottle-neck near its mouth, and the stopper $c$ may be entered tightly in said gradually-contracted part of the tube. At its lower end the tube is round, as at $g$, and has a bottom $h$ with a central port $i$. This shape of the tube at the lower end results in forming a small circular chamber $j$, which contains the head $k$ of a valve, having at its under side a pendent tapered plug $k'$, which closes the said central port $i$, the tapered plug projecting through said port and below the bottom $h$. The length of the tapered plug $k$ as compared with the height of the chamber $j$ is enough greater to insure that the point end of the plug will never withdraw from the port $i$. The portion of the glass tube between the upper end $a'$ and the chamber $j$ in the lower end has serpentine bends $l$, which prevent the insertion of a wire.

It will be seen that the above-described glass tube has its top end fitted in direct contact with the upper expanded end $a$ of the bottle-neck and that the portion of the glass tube below the smallest diameter $b$ of the neck of the bottle is secured within the neck by suitable cement $m$, which fills the space around said tube and between the tube and the interior wall of the neck.

When it is desired to pour out any part of the liquid contents of the bottle, the stopper $c$ must of course first be removed. Then upon tilting the bottle the valve will uncover the port $i$ and the tapered plug $k'$ will slide through the port $i$, the small end of the plug still remaining within said port; but the latter will be opened sufficient to permit the liquid to flow out. As the small end of the tapered plug $k'$ will never completely withdraw from the port $i$, the valve will resume the closed position shown in the drawings whenever the bottle is standing upright.

It will be understood that ordinary bottles now in use have the contraction $b$ in the neck between its ends, and this fact enables the application of my improved device to all of such bottle-necks, as the cement filling may be readily expanded by slightly rotating the glass tube, so as to fill the larger portion of the neck below the contraction. After the cement once sets it is obviously impossible to withdraw the tube from the neck.

Having thus described my invention, what I claim as new, and desire to secure by Letters Patent, is—

1. A non-refillable bottle having a neck which is smallest interiorly at the point where the innermost end of the stopper terminates when the stopper is forced in, and from which point the neck slightly expands upward to the mouth and also expands from said point down to the body of the bottle; a glass tube within the neck of the bottle and whose top end fits in direct contact with said upward expanded part of the neck—said top end of the tube having an internal size adapted to receive the stopper, and the tube having a series of serpentine bends extending downward and at its lower end provided with a circular chamber having a port; and a valve having a head which is confined in said chamber and provided with a plug which enters said port.

2. The herein-described non-refillable bottle, comprising a glass tube whose upper end fills the mouth of the bottle, and whose lower end has a circular chamber having a port and provided with serpentine bends between said upper end and chamber, and a valve having a head confined in said chamber and provided on its under side with a tapered plug projecting through said port—the length of the plug as compared with the height of the chamber being enough greater to insure that in operation the point end of the plug will never withdraw from said port.

In testimony whereof I affix my signature in presence of two witnesses.

GOULD O. HILDEBRAND.

Witnesses:
CHARLES B. MANN, Jr.,
JOHN W. HEWES.